(12) United States Patent
Choi

(10) Patent No.: US 9,111,342 B2
(45) Date of Patent: Aug. 18, 2015

(54) METHOD OF TIME-EFFICIENT STEREO MATCHING

(75) Inventor: Min-Sheo Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 13/177,967

(22) Filed: Jul. 7, 2011

(65) Prior Publication Data

US 2012/0008857 A1    Jan. 12, 2012

Related U.S. Application Data

(60) Provisional application No. 61/361,972, filed on Jul. 7, 2010.

(51) Int. Cl.
*G06K 9/00* (2006.01)
*G06T 7/00* (2006.01)

(52) U.S. Cl.
CPC ............. *G06T 7/0022* (2013.01); *G06T 7/0075* (2013.01); *G06T 2207/10012* (2013.01); *G06T 2207/20016* (2013.01)

(58) Field of Classification Search
None
See application file for complete search history.

(56) References Cited

U.S. PATENT DOCUMENTS

| 6,606,404 | B1 * | 8/2003 | Zhang et al. | 382/154 |
| 6,608,923 | B1 * | 8/2003 | Zhang et al. | 382/154 |
| 2004/0240725 | A1 * | 12/2004 | Xu et al. | 382/154 |
| 2005/0078866 | A1 * | 4/2005 | Criminisi et al. | 382/154 |
| 2006/0013509 | A1 * | 1/2006 | Kee et al. | 382/312 |
| 2006/0120594 | A1 * | 6/2006 | Kim et al. | 382/154 |
| 2007/0286476 | A1 * | 12/2007 | Kim et al. | 382/154 |
| 2009/0052780 | A1 * | 2/2009 | Kwon et al. | 382/190 |
| 2010/0039499 | A1 * | 2/2010 | Nomura et al. | 348/43 |
| 2010/0271511 | A1 * | 10/2010 | Ma et al. | 348/239 |

FOREIGN PATENT DOCUMENTS

WO    WO 2009061305 A1 *  5/2009

OTHER PUBLICATIONS

Zuxun, X., On the generation of parallax grid by using off-line digital correlation, 1984, XVth ISPRS Congress Technical Commission III: Mathematical Analysis of Data, vol. XXV Part A3, pp. 1194-1216.*
Van Meerbergen et al., A Hierarchical Symmetric Stereo Algorithm using Dynamic Programming, 2002, International Journal of Computer Vision, vol. 47, No. 1-3, pp. 275-285(11).*
Larson et al., Bayesian stereo: 3D vision designed for sensor fusion, 2004, International Society for Optical Engineering, vol. 5608, pp. 198-206.*
Stelmach et al.,Stereo Image Quality: Effects of Mixed Spatio-Temporal Resolution, 2000, IEEE Transactions on Circuits and System for Video Technology, vol. 10, No. 2, pp. 188-193.*

(Continued)

*Primary Examiner* — Stephen R Koziol
*Assistant Examiner* — Jonathan S Lee
(74) *Attorney, Agent, or Firm* — Kile Park Reed & Houtteman PLLC

(57) ABSTRACT

Unlike previous works with emphasis on hardware level optimization for the processing time reduction in stereo matching, the present invention provides a time efficient stereo matching method which is applicable at an algorithm level, which is compatible with and thus can be employed to any types of stereo matching implementation.

5 Claims, 5 Drawing Sheets

(56) References Cited

OTHER PUBLICATIONS

Aflaki et al., Impact of Downsampling Ratio in Mixed-Resolution Stereoscopic Video, 2010, 3DTV-Conference: The True Vision—Capture, Transmission, and Display of 3D Video (3DTV-CON), pp. 1-4.*

Mendonca, P.R.S., Multiview Geometry: Profiles and Self-Calibration, 2001, Dissertation, University of Cambridge.*

Kraft et al., Computing Stereo-Vision in Video Real-Time with Low-Cost SIMID-Hardware, 2005, ACIVS, pp. 697-704.*

Belhumeur et al., A Bayesian Treatment of the Stereo Correspondence Problem Using Half-Occluded Regions, 1992, Computer Vision and Pattern Recognition, pp. 506-512.*

Magnor, M. and Girod, B., Hierarchical Coding of Light Fields with Disparity Maps, 1999, Image Processing, vol. 3, pp. 334-338.*

Gangwal, O.P. and Berretty, R., Depth Map Post-Processing for 3D-TV, 2009, Consumer Electronics, pp. 1-2.*

Rastgar, H., Boufama, B., and Bouakaz, S., Efficient Surface Interpolation with Occlusion Detection, Oct. 2006, JCIS—2006 Proceedings, pp. 1-4.*

Jia, Y., Zhang, X., Li, M., and An, L., A Miniature Stereo Vision Machine (MSVM-III) for Dense Disparity Mapping, 2004, Proceedings of the 17th International Conference on Pattern Recognition, vol. 1, pp. 728-731.*

Sizintsev, M., Kuthirummal, S., Samarasekera, S., Kumar, R., Sawhney, H.S., Chaudhry, A., GPU Accelerated Realtime Stereo for Augmented Reality, Proceedings Intl. Symp. 3D Data Processing, Visualization and Transmission, pp. 1-8.*

Sethuraman, S., Jordan, A.G., Siegel, M.W., Multiresolution based hierarchical disparity estimation for stereo image pair compression, 1994, Proc. of the Symposium on Application of subbands and wavelets, pp. 1-7.*

Sven Forstmann et al., "Real-time stereo by using dynamic programming", Technical Report of IEICE, The Institute of Electronics, Information, and Communication Engineers, pp. 1-6, 2004.

Liang Wang et al., "High-quality Real-Time Stereo using Adaptive Cost Aggregation and Dynamic Programming", pp. 1-8, 2006.

Bobick et al., Large Occlusion Stereo, International Journal of Computer Vision 33(3), 1999, pp. 181-200, Kluwer Academic Publishers, The Netherlands.

* cited by examiner

Left Image  Right Image  Disparity Map

Original Input Image    Adapted Input Image

METHOD OF TIME-EFFICIENT STEREO MATCHING

CROSS-REFERENCE TO RELATED APPLICATIONS

This application claims the benefit of U.S. Provisional Application No. 61/361,972, filed on Jul. 7, 2010 in the USPTO, the disclosures of which are incorporated herein by reference.

BACKGROUND

1. Field of the Invention

The present invention relates to stereo matching.

2. Description of the Related Art

Stereo Matching (or stereo correspondence) is one of the most actively researched topics in computer vision. Though there are other available representations, most stereo matching methods produce a single-valued disparity function d(x, y) with respect to a reference image, which could be one of the input images, or a view in between some of the images. By using such representation, the concept of a disparity space (x, y, d) is naturally introduced. In computer vision, disparity is often treated as synonymous with inverse depth, since both are equivalent to each other as simple trigonometric relationship reveals. If the (x, y) coordinates of the disparity space are taken to be coincident with the pixel coordinates of a reference image chosen from input data set, the correspondence between a pixel (x, y) in reference image r and a pixel (x', y') in matching image m is then given by $$x'=x+d(x,y), y'=y, \quad (1)$$

where d(x, y) is a disparity.

Once the disparity space has been specified, the concept of a disparity space image or DSI is introduced. In general, a DSI is any image or function defined over a continuous or discrete version of disparity space (x, y, d). In practice, the DSI usually represents the confidence or log likelihood (i.e., cost) of a particular match implied by d(x, y). The goal of a stereo correspondence algorithm is then to produce a single-valued function in disparity space d(x, y) that best describes the shape of the surfaces in the scene. This can be viewed as finding a surface embedded in the disparity space image that has some optimality property, such as lowest cost and best (piecewise) smoothness. FIG. 1 shows an example of slice through a typical DSI.

The stereo algorithms generally perform the following four steps: (step 1) matching cost computation; (step 2) cost (support) aggregation; (step 3) disparity computation/optimization; and (step 4) disparity refinement. The actual sequence of steps taken depends on the specific algorithm. Some local algorithms, however, combine steps 1 and 2 and use a matching cost that is based upon a support region, e.g. normalized cross-correlation and the rank transform. On the other hand, global algorithms make explicit smoothness assumptions and then solve an optimization problem. Such algorithms typically do not perform an aggregation step, but rather seek a disparity assignment (step 3) that minimizes a global cost function that combines data (step 1) and smoothness terms. The main distinction between these algorithms is the minimization procedure used, e.g., simulated annealing, probabilistic (mean-field) diffusion, or graph cuts.

In between these two broad classes are certain iterative algorithms that do not explicitly state a global function that is to be minimized, but whose behavior mimics closely that of iterative optimization algorithms. Hierarchical (coarse-to-fine) algorithms resemble such iterative algorithms, but typically operate on an image pyramid, where results from coarser levels are used to constrain a more local search at finer levels.

The vast majority of researches in stereo matching have been focused on improving the accuracy of a resulting disparity map. In contrast, reducing the processing time in real-time or near real-time stereo matching applications has been a relatively less popular research topic until recently. However, there are many important applications which require decent stereo matching accuracy while real-time requirements being met. Such applications include Augmented Reality (AR), New View Synthesis (NVS) (e.g., for gaze correction in video-conferencing or Free Viewpoint Video), robot vision for navigation or unmanned car driving, etc.

Processing time reduction in stereo matching is mostly achieved by hardware optimization or acceleration. For example, Wang et al. ("High-quality real-time stereo using adaptive cost aggregation and dynamic programming", 3DPVT 2006) discussed GPU acceleration method for their algorithm proposed as an add-on to the existing basic Dynamic Programming (DP) among others, and thereby tried to meet the real-time requirements. On the other hand, ("Real-time stereo by using dynamic programming", CVPR 2004) proposed a coarse to fine approach and MMX based assembler optimization, and also proposed a solution to reduce the size of DP matrix by first applying DP on every n-th scanline and then finding possible disparity range for applying DP on remaining in-between scanlines—which is a rare occasion to propose algorithm-level consideration for processing time reduction (i.e., by reducing the amount of computations) while its applicability is limited to the DP based stereo algorithm.

It is, however, highly desirable to provide the processing time reduction measure on an algorithm-level which is compatible with any hardware-level implementation for processing time reduction, since this may help make any type of stereo matching implementation more suitable for real time application (or at least enhance the processing speed).

SUMMARY

An aspect of the present invention provides the method of stereo matching comprising: receiving two images, each obtained from different viewing angle; selecting a plurality of scanlines from each image; calculating disparities on each pair of the selected scanlines, the pair including one scanline from one image and the other scanline from the other image; and generating disparities on each pair of remaining scanlines, the pair including one scanline from one image and the other scanline from the other image, based upon the calculated disparities of at least one neighboring scanline.

According to an aspect of the present invention, a disparity map may be generated based upon the disparities of each pair of the selected scanlines and the disparities of each pair of remaining scanlines.

The disparities on each pair of the selected scanlines are calculated based upon scanline-based stereo matching algorithm.

According to an aspect of the present invention, more scanlines may be selected from central area of the image than from marginal area of the image in vertical direction.

An aspect of the present invention also provides the stereo matching comprising: receiving two images including a reference image and a target image, each associated with different viewing angle; down-sampling the two images in vertical direction in a ratio of 1/n; generating a first disparity map with respect to the two down-sampled images using a predetermined stereo matching algorithm; and generating a second disparity map by up-sampling the first disparity map in vertical direction in a ratio of n.

The predetermined stereo matching algorithm may be performed either on a scanline basis or on a non-scanline basis.

The disparity of each pixel in the second disparity map is generated based upon at least one pixel of the first disparity map.

An aspect of the present invention provides the method of stereo matching comprising: receiving two images including a reference image and a target image, each associated with different viewing angle; down-sampling the two images vertically in a ratio of 1/m and horizontally in a ratio of 1/n; generating a first disparity map with respect to the two down-sampled images using a predetermined stereo matching algorithm; and generating a second disparity map by up-sampling the first disparity map vertically in a ratio of m and horizontally in a ratio of n, wherein m is greater than n and both are positive number.

EFFECT OF THE INVENTION

In the present invention, the spatial redundancy is exploited in order to achieve an algorithm-level processing time reduction in stereo matching. According to an aspect of the present invention, it is possible to significantly reduce the processing time in stereo matching, while causing negligible error increase in a resulting disparity map.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
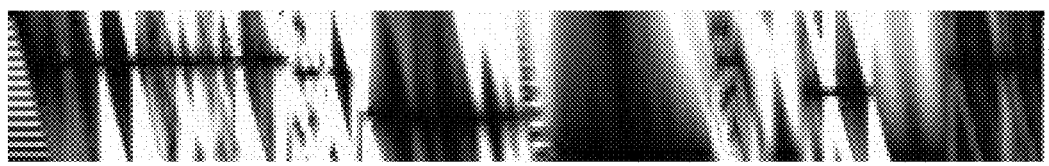
FIG. 1 shows a slice of typical disparity space image which can be understood as a cross sectional view of the disparity space volume.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 2:
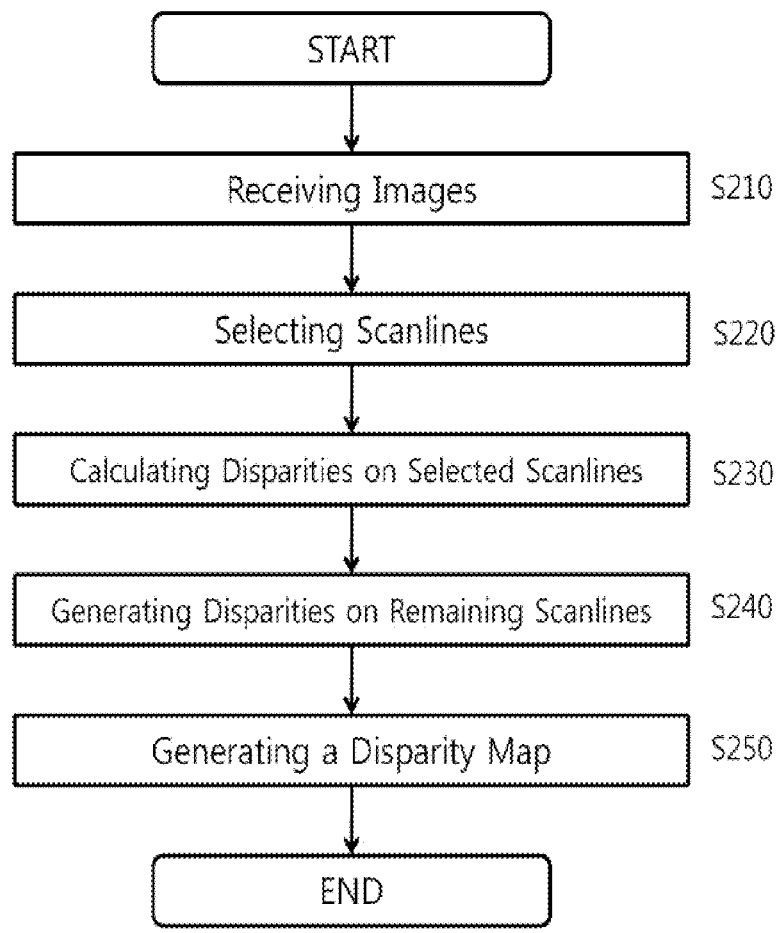
FIG. 2 is a flowchart illustrating a sequence of a stereo matching method according to an embodiment of the present invention.

FIG. 2 is a flowchart illustrating a sequence of a stereo matching method according to an embodiment of the present invention.

Referring to FIG. 2, the stereo matching routine is initiated once two stereo images are inputted (S210). The two images are assumed a pair of rectified images which observe epipolar geometry. One image is a reference image, and the other is a matching image. In S220, multiple scanlines are selected for each image. Each scanline selected from the reference image corresponds to each scanline selected from the matching image. Depending upon applications, more scanlines may be selected from central area of the image than from marginal area of the image in vertical direction, since this may provide better result on visually significant central area in image. In S230, the disparities are calculated for each scanline pair. A scanline-based stereo algorithm such as Dynamic Programming (DP) is primarily considered to be applied to S230, while other types of stereo algorithms are still applicable. This may involve cost computation, cost aggregation, disparity computation, and (optional) disparity refinement as in conventional stereo matching algorithms. In S240, the disparities for remaining scanlines are generated based upon the disparities of neighboring scanlines that have been calculated in S230. For example, the disparity may be copied from the nearest neighboring scanline where disparities have been calculated, or may be interpolated from the calculated disparities of neighboring scanlines. In S250, a final disparity map is generated using the disparities obtained from S230 and S240.

Figure 3:
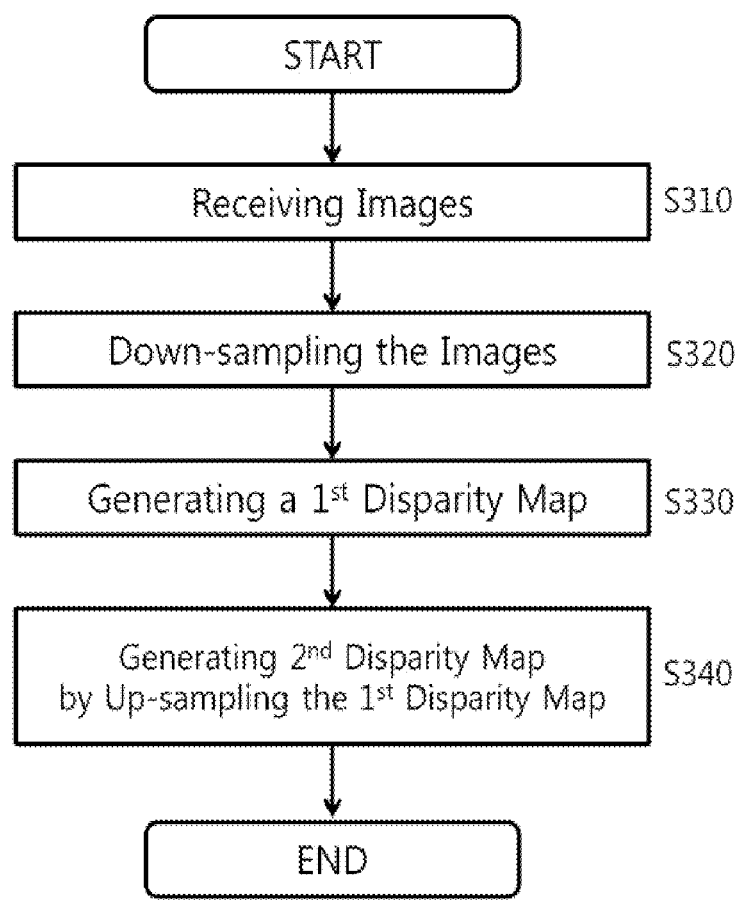
FIG. 3 is a flowchart illustrating a sequence of a stereo matching method according to an embodiment of the present invention.

FIG. 3 is a flowchart illustrating a sequence of a stereo matching method according to an embodiment of the present invention. While the stereo matching sequence in FIG. 2 is more suitable for the scanline-based stereo algorithm, the sequence in FIG. 3 is characterized in that it can be applied equally efficiently to any types of stereo algorithm, whether scanline-based or not.

Referring to FIG. 3, the stereo matching process starts once two stereo images are inputted (S310). Again, the two images are assumed a pair of rectified images which observe epipolar geometry. One image is a reference image, and the other is a matching image. In S320, the input images are down-sampled multiple scanlines in a predetermined ratio either in vertical direction only or in both vertical and horizontal directions. Depending upon applications, different down-sampling ratio may be applied to different part of image, for example, in the way to provide better accuracy on visually significant central area in image. In S330, an initial disparity map with respect to the two down-sampled images is generated using a predetermined stereo matching algorithm. The predetermined stereo algorithm may be any types of stereo algorithm, since the present invention is not limited to any specific type of stereo algorithm, but is compatible with virtually any types of stereo algorithm and implementation. In S340, a final disparity map is generated by up-sampling the initial disparity map in vertical direction in a ratio inverse to the predetermined ratio used in S320 in the direction selected in S320. During the up-sampling, various techniques such as copying from the nearest neighboring value or interpolating from a plurality of neighboring values may be applied. It is noted that the disparity value of the initial disparity map should be multiplied by m during the up-sampling in S340 if the input images have been down-sampled in the ratio of 1/m in a horizontal direction in S320. This multiplication may cause the ambiguity problem as further described below, since the unit disparity value becomes m (rather than 1) in the final disparity map.

Figure 4:
FIG. 4 illustrates a stereo image pair and the corresponding disparity map.
Figure 5:
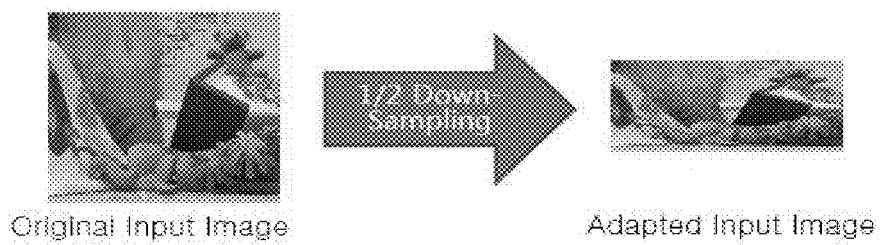
FIG. 5 illustrates down-sampling of input Image in a vertical direction.

FIG. 4 illustrates a stereo image pair and the corresponding disparity map. It is observed that disparity map is much simpler than an original stereo image pair as shown in FIG. 4. If the spatial redundancy in a resulting disparity map could be dealt with properly during disparity computation process, the computation efficiency would increase significantly. An experiment with ground truth disparity maps reveals that a final disparity map can be restored from one in reduced resolution, with a relatively little increased error rate—much less than rule of thumb expectation. Table 1 shows how seriously a resulting disparity map is affected by skipping (and subsequently interpolating) horizontal lines in different frequency (the first and second rows in Table 1) and both horizontal and vertical lines (the third row in Table 1) in a ground truth disparity map in terms of error rate increase. After all, these may give a promising clue for the approach according to one embodiment of the present invention—computing the disparity in lowered resolution through down-sampling and then restoring the final disparity in an original resolution by up-sampling. FIG. 5 illustrates down-sampling of input Image in a vertical direction in a ratio of 1/2. Up-sampling can be understood as a reverse procedure to the down-sampling.

TABLE 1

Error Rate Increase in Ground Truth Disparity Maps

| Mode | Venus | Teddy | Cones |
|---|---|---|---|
| ½ Scan (Vertical) | 0.07% | 1.14% | 0.60% |
| ⅓ Scan (Vertical) | 0.26% | 1.57% | 0.92% |
| ¼ Resolution (½ Vertical × ½ Horizontal) | 0.11% | 1.15% | 1.35% |

This 1/2 down-sampling is expected to allow all following computations (cost computation, cost aggregation, and disparity selection) reduced in a half from the outset. For example, the matching cost volume c(x, y, d) may be reduced by half as follows:

$$\text{Size } (c(x, y, d)) = \left[ width_{input\_image}, \frac{1}{2} \times height_{input\_imag}, disparity\_range \right]. \quad (2)$$

This half sized cost volume is used in subsequent filtering (at cost aggregation) and disparity selection, and thus may reduce the overall processing time by half.

In the meantime, down-sampling in horizontal direction may also be considered. It is noted, however, that down-sampling in horizontal direction is totally different from its vertical direction counterpart, since it directly reduces the disparity resolution—in 1/2 down-sampling, the disparity resolution is also reduced by half—and causes ambiguity problem in final disparity restoration step. Moreover, some applications even need half pixel resolution (i.e., enhanced resolution in horizontal direction) in a disparity map. Therefore, horizontal down-sampling is not discussed further here since it can be used only in limited application scenarios. Further, higher ratio down-sampling in vertical direction may also be used, depending upon specific application needs—not shown herein, however.

There are further experiments conducted to show the effect of the present invention. Dynamic Programming (DP) was chosen as stereo algorithm for the experiments. The time efficient approach according to the present invention has been tested in combination with different error controlling measures. Another purpose of this experiment is to show that the negligible error increase possibly caused by the time efficient approach according to the present invention can be addressed without significantly reducing the effect of the present invention.

In the experiments, the input images (i.e., the stereo pair) are assumed as rectified ones. Specifically, four Middlebury test images were used: Tsukuba, Venus, Teddy, and Cones. The accuracy of a resulting disparity map and the processing time were measured as follows:

1. Processing time—It was compared with that of basic DP reference algorithm, which was implemented by following A. F. Bobick et al. ("Large Occlusion Stereo", IJCV 1999), but without Ground Control Points.
2. Accuracy—It was evaluated by measuring the percentage of bad pixels in a resulting disparity map.

Table 2 shows the processing time spent in different algorithmic approaches. In the Table, Basic DP indicates the reference basic DP algorithm as identified above. In Trials 1 to 5, 1/2 down-sampling in vertical direction was employed, and the enhanced parameterization scheme based upon [8] was also included. Trial 2 further includes 3×1 Gaussian filter applied at cost aggregation step. Trial 3 used an Aggregated Support Weight Filter (ASWF) in size of 6×1 instead of Gaussian filter, Trial 4 in size of 12×1. Finally, Trial 5 used a Modified Aggregated Support Weight Filter (MASWF) in size of 12×1.

TABLE 2

Processing Time Comparison.

| Algorithm | Processing time (% compared to Ref.) |
|---|---|
| Basic DP (Reference Algorithm) | 100% |
| Trial 1 (½ Scan & E. Para.*) | 48.3% |
| Trial 2 (½ Scan, E. Para. & GF**) | 60.0% |
| Trial 3 (½ Scan, E. Para. & ASWF***: 6×1) | 60.7% |
| Trial 4 (½ Scan, E. Para. & ASWF: 12×1) | 75.0% |
| Trial 5 (½ Scan, E. Para. & MASWF****: 12×1) | 80.3% |

*E. Para.: Enhanced Parameters;
**GF: Gaussian Filter;
***ASWF: Adaptive Support Weight Filter; and
****MASWF: Modified Adaptive Support Weight Filter From the results in Table 2, it is noted that the additional time spent by even employing the sophisticated filter like MASWF does not exceed the time saved from the time efficient approach according to the present invention.

Figure 6:
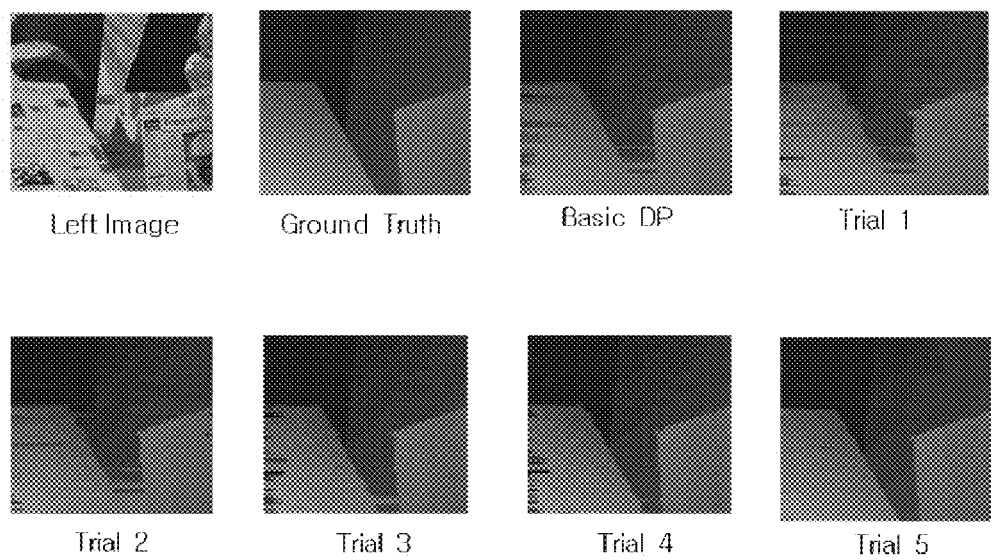
FIG. 6 shows a reference image, a ground truth image, and multiple resulting disparity maps generated from different trials with Venus image.
Figure 7:
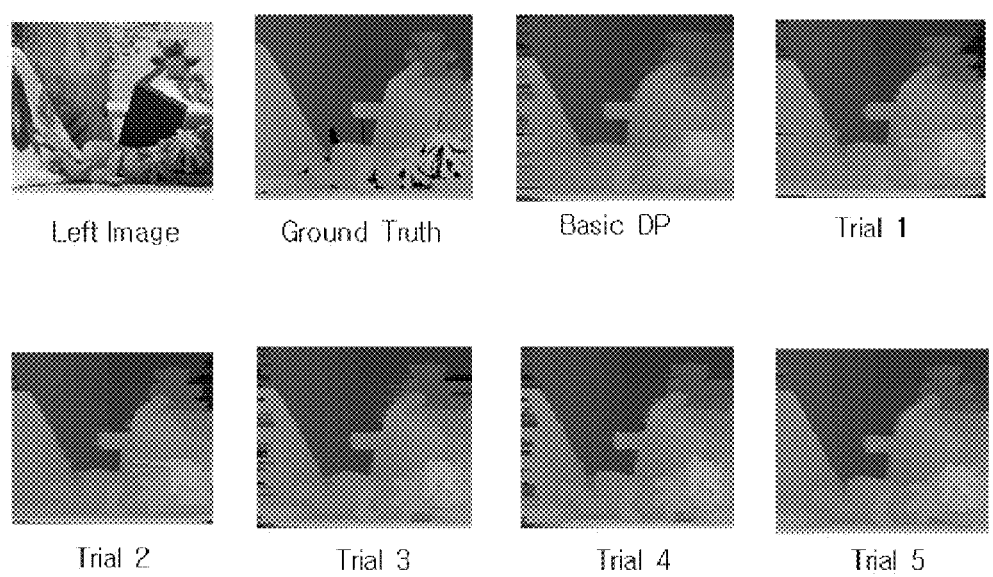
FIG. 7 shows a reference image, a ground truth image, and multiple resulting disparity maps generated from different trials with Teddy image.
Figure 8:
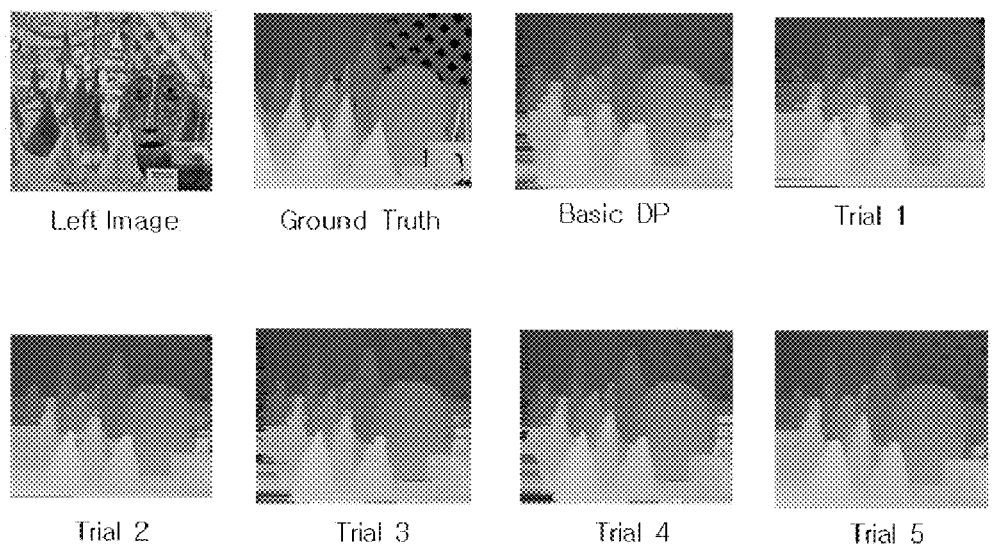
FIG. 8 shows a reference image, a ground truth image, and multiple resulting disparity maps generated from different trials with Cones image.

Table 3 shows the accuracy comparison for 4 Middlebury test images in different algorithmic approaches. It is again noticeable that applying even simple vertical filtering in 1/2 down-sampling mode outperformed the Basic DP algorithm in normal mode (i.e., no down-sampling involved). The MASWF showed the best result among all tested algorithms. FIGS. 6 to 8 show resulting disparity maps from the Middlebury stereo data sets.

TABLE 3

Accuracy Comparison

| Algorithm | Tsukuba (unoccl.) | Venus (unoccl.) | Teddy (unoccl.) | Cones (unoccl.) | Accuracy (avg. error rate) |
|---|---|---|---|---|---|
| Basic DP | 14.7% | 9.46% | 15.3% | 12.8% | 19.7% |
| Trial 1 | 11.3% | 9.36% | 16.9% | 12.1% | 18.9% |
| Trial 2 | 9.93% | 8.11% | 17.6% | 10.5% | 18.3% |
| Trial 3 | 5.21% | 3.61% | 11.2% | 10.1% | 13.9% |
| Trial 4 | 5.75% | 3.70% | 11.9% | 10.4% | 14.3% |
| Trial 5 | 3.97% | 2.18% | 10.3% | 8.55% | 12.5% |

Figure 9:
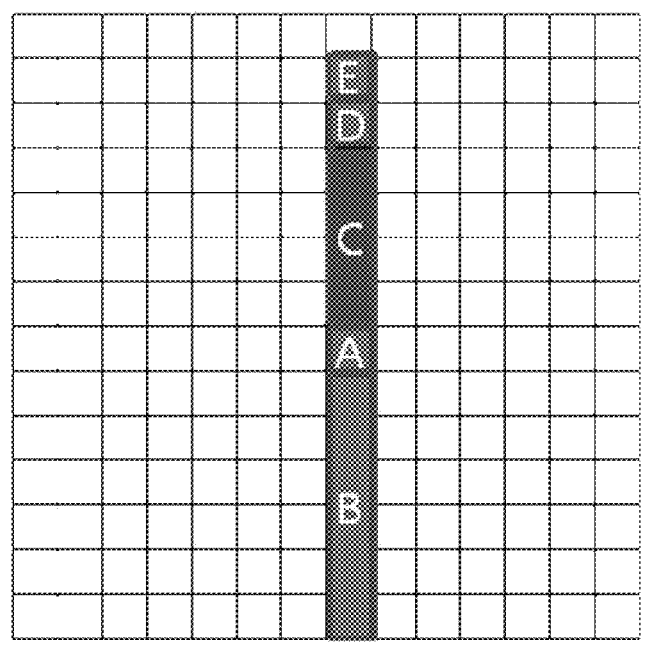
FIG. 9 illustrates a pixel plane where a 12×1 modified Adaptive Support Weight Filter is applied according to the present invention.

FIG. 9 shows a Modified Adaptive Support Weight Filter (MASWF) applied in vertical direction in a matching cost volume. For illustration, the pixels corresponding to A, B, D, E are similar enough for continuity to be considered maintained if they are located in proximity, but are different from C (and thus the continuity is not established between A and C). In FIG. 10, the cells E and D are not aggregated into the center cell A since the discontinuity occurs between A and D (and E) due to the region C, all cells in region B are aggregated into A during cost aggregation. We believe this may more clear separation in object boundary and thus more accurate resulting disparity map. In contrast, the traditional Adaptive Support Weight Filter (ASWF) does not consider how this kind of continuity is presented in input images.

In MASWF, the weight given for each cost value in cost volume can be expressed as a following equation:

$$w(p, l) = \begin{cases} \exp\left(-\left(\frac{\Delta C_{pl}}{\gamma_c} + \frac{\Delta g_{pl}}{\gamma_g}\right)\right), & \text{when the continuation is kept} \\ 0, & \text{when the continuation is lost} \end{cases} \quad (3)$$

where $\gamma_c$ and $\gamma_g$ are weighting constants which are empirically determined, p is location of a center pixel, l is a pixel in a support region (i.e., a pixel in the filtering window), and $\Delta C_{pl}$ and $\Delta g_{pl}$ are color difference and Euclidean distance in corresponding pixels in stereo images (here, of course, vertically 1/2 down-sampled ones), respectively.

With this sophisticatedly decided weight for each cell in the cost volume, the final output of MASWF (i.e., the aggregated cost) is given as follows:

$$C'(p, d) = \frac{\sum_{l \in \delta_p, l' \in \delta_q} w(p, l) w'(q, l') C(l, d)}{\sum_{l \in \delta_p, l' \in \delta_q} w(p, l) w'(q, l')}, \quad (10)$$

where $\delta_p$ and $\delta_q$ indicate each support region in left and right images, p is a center pixel in the filtering window in the left image, q is hypothesized matching pixel in the right image (i.e., q=p+d), and l and l' are pixels in each support region $\delta_p$ and $\delta_q$, respectively.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of stereo matching comprising:
   receiving two images including a reference image and a target image, each associated with a different viewing angle;
   down-sampling the two images in a vertical direction in a ratio of 1/n without down-sampling in the horizontal direction;
   generating a first disparity map for the target image using a predetermined stereo matching algorithm and the two down-sampled images; and
   generating a second disparity map for the target image by up-sampling the first disparity map in the vertical direction in a ratio of n without applying any stereo matching algorithm,
   wherein the second disparity map is a final disparity map for the target image in the sense that no more stereo matching is applied to the second disparity map.

2. The method of claim 1, wherein the predetermined stereo matching algorithm is performed either on a scanline basis or on a non-scanline basis.

3. The method of claim 1, wherein the disparity of each pixel in the second disparity map is generated based upon at least one pixel of the first disparity map.

4. A method of stereo matching comprising:
   receiving two images including a reference image and a target image, each associated with a different viewing angle;
   down-sampling the two images vertically in a ratio of 1/m and horizontally in a ratio of 1/n;
   generating a first disparity map for the target image using a predetermined stereo matching algorithm and the two down-sampled images; and
   generating a second disparity map for the target image by up-sampling the first disparity map vertically in a ratio of m and horizontally in a ratio of n without applying any stereo matching algorithm,
   wherein m is greater than n and both are positive numbers, and
   wherein the second disparity map is a final disparity map for the target image in the sense that no more stereo matching is applied to the second disparity map.

5. The method of claim 4, wherein the disparity value of the first disparity map is multiplied by n during the up-sampling.

* * * * *